US008910688B2

(12) United States Patent
Barmichev et al.

(10) Patent No.: US 8,910,688 B2
(45) Date of Patent: Dec. 16, 2014

(54) LOW VOLUME AUTOCLAVE HAVING CONFIGURABLE SHAPE

(75) Inventors: Sergey Barmichev, Bothell, WA (US); Kevin Matthew Retz, Bothell, WA (US)

(73) Assignee: The Boeing Company, Chicago, IL (US)

( * ) Notice: Subject to any disclaimer, the term of this patent is extended or adjusted under 35 U.S.C. 154(b) by 273 days.

(21) Appl. No.: 13/035,932

(22) Filed: Feb. 26, 2011

(65) Prior Publication Data

US 2012/0073745 A1   Mar. 29, 2012

Related U.S. Application Data

(63) Continuation-in-part of application No. 11/761,744, filed on Jun. 12, 2007.

(51) Int. Cl.
*B32B 37/10* (2006.01)
*B29C 35/02* (2006.01)
*B29C 70/44* (2006.01)
*B29L 31/30* (2006.01)

(52) U.S. Cl.
CPC ..... *B29C 35/0227* (2013.01); *B29L 2031/3085* (2013.01); *B29L 2031/3076* (2013.01); *B29C 70/44* (2013.01)
USPC ........... 156/381; 156/382; 156/499; 219/400; 363/110; 363/111; 363/112

(58) Field of Classification Search
USPC .................. 156/381, 384, 499, 382; 219/400; 363/110–112
See application file for complete search history.

(56) References Cited

U.S. PATENT DOCUMENTS

| 2,411,497 | A | 11/1946 | Barnes |
| 3,623,303 | A | 11/1971 | Nickla |
| 4,997,511 | A | 3/1991 | Newsom |
| 5,424,046 | A | 6/1995 | Smith et al. |
| 6,001,305 | A | 12/1999 | Mueller |
| 6,257,858 | B1 | 7/2001 | Pabsch et al. |
| 6,692,681 | B1 | 2/2004 | Lunde |
| 6,872,918 | B2 | 3/2005 | Toll |
| 2008/0308224 | A1 | 12/2008 | Barmichev et al. |

FOREIGN PATENT DOCUMENTS

| DE | 19529508 C1 | 10/1996 |
| EP | 0333389 A1 | 9/1989 |
| JP | 04135810 | 5/1992 |
| JP | 04135810 A | 5/1992 |
| SU | 1346229 | 10/1987 |
| SU | 1346229 A1 | 10/1987 |
| UA | 12390 U | 2/2006 |
| WO | 2007043876 A1 | 4/2007 |
| WO | 2008154602 A1 | 12/2008 |

OTHER PUBLICATIONS

Machine Translation of DE 19529508.*
Full translation of DE 19529508, Oct. 10, 1996.*
International Search Report and Written Opinion of the International Searching Authority, dated Oct. 6, 2008, regarding Application No. PCT/US2008/066604 (WO2008154602), 15 pages.

(Continued)

*Primary Examiner* — Christopher Schatz
(74) *Attorney, Agent, or Firm* — Yee & Associates, P.C.

(57) ABSTRACT

An autoclave may be reconfigured to accommodate differently shaped parts by relatively rotating portions of the autoclave.

25 Claims, 10 Drawing Sheets

(56) References Cited

OTHER PUBLICATIONS

Campbell (Ed.), "Manufacturing Processes for Advanced Composites," Elsevier Advanced Technology, Oxford, UK, 2004, pp. 176-177, figure 2.

USPTO Office Action, dated Sep. 16, 2010, regarding U.S. Appl. No. 11/761,744, 17 pages.

Response to Office Action, dated Jan. 12, 2011, regarding U.S. Appl. No. 11/761,744, 17 pages.

Response to Notice of Non-Compliant Amendment, dated Apr. 28, 2011, regarding U.S. Appl. No. 11/761,744, 17 pages.

Response to Notice of Non-Compliant Amendment, dated Jul. 19, 2011, regarding U.S. Appl. No. 11/761,744, 17 pages.

USPTO Final Office Action, dated Sep. 28, 2011, regarding U.S. Appl. No. 11/761,744, 13 pages.

Response to Final Office Action, dated Jan. 27, 2012, regarding U.S. Appl. No. 11/761,744, 12 pages.

European Search Report, dated Jun. 21, 2012, regarding Application No. EP12155488, 5 pages.

\* cited by examiner

LOW VOLUME AUTOCLAVE HAVING CONFIGURABLE SHAPE

CROSS REFERENCE TO RELATED APPLICATIONS

This application is a continuation-in-part of U.S. patent application Ser. No. 11/761,744 filed Jun. 12, 2007, the entire disclosures of which is incorporated by reference herein.

TECHNICAL FIELD

The present disclosure generally relates to autoclaves, and deals more particularly with a low volume autoclave having a configurable shape adapted to process differently shaped parts.

BACKGROUND

Autoclaves are commonly used in a variety of industries to apply heat and pressure to parts or other objects. For example, in the aircraft industry, an autoclave may be used to cure fiber reinforced composite parts. Autoclaves are typically cylindrically shaped, insulated steal tanks that are sized to accommodate the largest part that is expected to be processed. As the size of the autoclave increases, particularly in diameter, the cost of manufacturing the autoclave may increase substantially, thus creating a practical limitation on the manufactured size of the autoclaves. In some applications, the autoclave may be larger than is required to process a particular part or group of parts, resulting in unused internal space in the autoclave. This unused space may add to operating costs since more-than-required time and energy are required to heat up and pressurize the autoclave, compared to that for an autoclave that is "right-sized" for the part.

Accordingly, there is a need for an autoclave having a size and shape that can be tailored to substantially match that of the part to be processed, thereby minimizing the containment volume in order to reduce capital and/or operating costs while increasing processing efficiency. There is also a need for a low volume autoclave that can be configured to match elongated parts of arbitrary shapes with portions particularly adapted to suit the particular part.

SUMMARY

The disclosed embodiments comprise a low volume autoclave having a configurable shape, and a related method of autoclaving parts. The disclosed autoclave allows curing of any arbitrary shape part or a family of irregularly shaped parts by configuring the shape of the autoclave to that of the part.

The amount of energy required to cure a given part is minimized by tailoring the autoclave to the size of the part, thereby allowing as small of a containment in the autoclave as possible. The apparatus also provides a method of manufacturing the autoclave using a minimum amount of material, thereby reducing the weight and/or cost of the autoclave.

In one embodiment, an autoclave includes an elongated pressure vessel that is sealed on both ends and has a circumferential joint between a first portion and a second portion. The autoclave further includes the portions defining an interior configured for accepting an elongated part, the joint being configured to create an angle between the portions and further creating an opening with a seal, the opening facilitating an insertion of the part into the interior, and the seal enabling pressurization of the interior.

In another embodiment, a low volume autoclave includes a pressure vessel having a joint between a first portion and a second portion, the first portion and the second portion each defining a portion of an internal cavity for accepting a part, the joint creating an angle between longitudinal axes of the first portion and the second portion, the joint having a seal to facilitate increased pressure and heat within the pressure vessel in a closed position. In addition, the autoclave may include a transport system for movably opening and closing the pressure vessel by separating the first portion from the second portion at the joint, the transport system configured to insert and remove the part from the cavity.

According to another disclosed embodiment, an autoclave is provided for processing differently shaped, elongate parts. The autoclave comprises first and second autoclave portions axially rotatable relative to each other, and a locking mechanism for locking the first and second portions together in any of a plurality of axial rotational positions. At least one of the first and second portions include first and second cylindrical bases and a curved central axis extending between the centers of the basis, wherein the first base has a diameter larger than that of the second base. The center of the first base may be laterally offset from the center of the second base along a line extending through the center of and substantially perpendicular to the first base. The first and second bases may respectively lie in first and second, differing planes.

According to still another embodiment, an autoclave is provided having a configurable internal volume for processing any of a plurality of differently shaped parts. The autoclave comprises a plurality of autoclave portions respectively having differing internal volume shapes, and a joint between at least certain ones of the autoclave portions allowing the adjacent portions to rotate relative to each other. The joint includes a locking mechanism for locking the first and second portions together in any of a plurality of axial rotational positions. The autoclave may further comprise a brace coupled between certain of the autoclave portions for securing the autoclave portions against movement relative to each other when the autoclave is pressurized.

According to a further embodiment, a method is provided of autoclaving differently shaped parts comprising configuring the shape of the autoclave to accommodate the parts by rotating differently shaped portions of the autoclave relative to each other. The method may further comprise opening the autoclave to receive a part by separating at least certain of the autoclave portions, placing the part into the open autoclave, closing the autoclave by joining the separated autoclave portions, and locking one or more of the portions into a desired rotational relationship.

The features, functions, and advantages can be achieved independently in various embodiments of the present disclosure or may be combined in yet other embodiments.

BRIEF DESCRIPTION OF THE ILLUSTRATIONS

FIGS. 2A and 2B are illustrations of isometric and elevational views of a low volume autoclave in accordance with another embodiment of the disclosure, specifically, FIG. 2A is a top view of an autoclave configured for curing an aircraft wing with a large sweep angle and FIG. 2B is a front view of the autoclave in FIG. 2A.

FIGS. 3A and 3B illustrations of isometric and elevational views of the low volume autoclave in a second position, specifically, FIG. 3A is a top view of an autoclave configured for curing an aircraft wing with a small sweep angle and FIG. 3B is a side view of the autoclave in FIG. 3A.

DETAILED DESCRIPTION

Apparatus and techniques for providing a low volume autoclave having a configurable shape are described herein. Many specific details of certain embodiments of the disclosure are set forth in the following description and in FIGS. 1 through 10 to provide a thorough understanding of such embodiments. One skilled in the art, however, will understand that the present disclosure may have additional embodiments, or that the present disclosure may be practiced without several of the details described in the following description. In the present discussion, it is understood that the term "fiber-reinforced composite material" or "reinforced composite material" includes various non-homogeneous polymer-based and non-polymeric based materials, commonly referred to as "reinforced composites", "carbon-fiber composites", or still other terms known in the art.

Figure 1A:
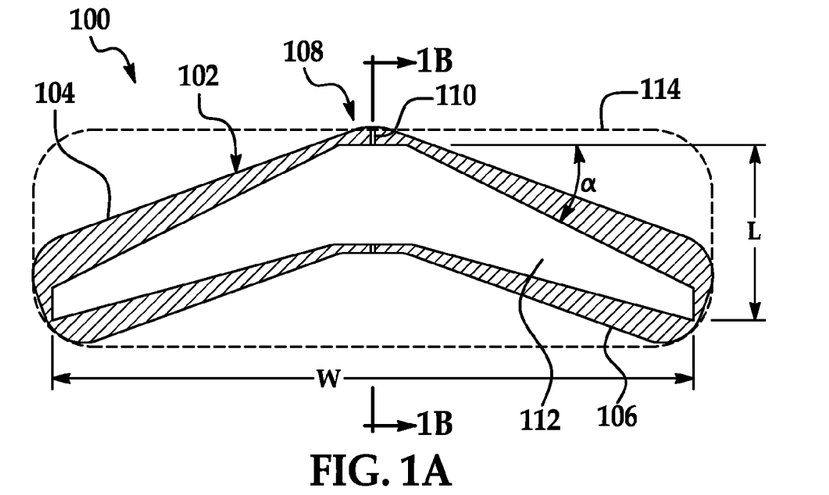
FIG. 1A is an illustration of a partial cross sectional view of an object inside a low volume autoclave having a configurable shape in accordance with an embodiment of the disclosure.

FIG. 1A is a partial cross sectional view of an object inside a low volume autoclave having a configurable shape in accordance with an embodiment of the disclosure. In environment 100, a low volume autoclave having a configurable shape 102 includes a first portion 104 offset from an angled second portion 106. A joining portion 108 may be included between the first portion 104 and the second portion 106. Further, the joining portion 108 may include a joint 110 that allows the low volume autoclave 102 to open, thus exposing the interior of the autoclave 102.

The environment 100 also includes a part 112 that may be relatively large (e.g., an aircraft wing). In some embodiments, the part 112 may include complex geometries. For example, the part 112 may be a single piece aircraft wing with a sweep and/or dihedral angle α. The part 112 may have a width W and a length L. For example, an aircraft wing may have the width W of approximately 200 feet and the length L of approximately 80 feet. In some aspects, the part 112 may be formed of a fiber-reinforced composite material that requires a curing process performed within the autoclave 102. Therefore, the part 112 may be placed inside of the low volume autoclave 102.

An existing (or prior art) autoclave 114 (represented by dashed lines) formed in a substantially cylindrical shape is represented around the low volume autoclave 102 for comparison purposes. It will be appreciated that the volume of the prior art autoclave 114 is much greater than the volume of the low volume autoclave 102.

Figure 1B:
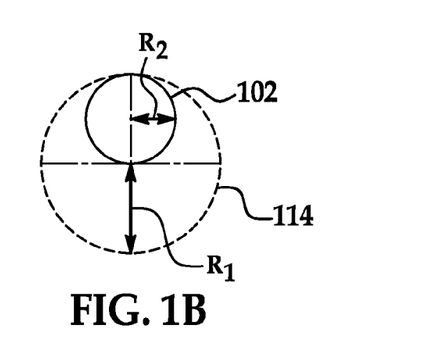
FIG. 1B is an illustration of a partial cross sectional view of the shape low volume autoclave in comparison to the cross sectional view of an existing autoclave.

FIG. 1B is a partial cross sectional view of the low volume autoclave 102 in comparison to the cross sectional view of the existing autoclave 114. The existing autoclave 114 has a radius $R_1$ while the low volume autoclave 102 has a radius $R_2$. As shown in FIG. 1B, the cross-sectional area of the low volume autoclave 102 is significantly less than the cross-sectional area of the existing autoclave 114 by a degree of squares, as derived from Equation 1 below. For example, in a particular embodiment, if the existing autoclave has a diameter of 80 feet ($R_1 \approx 40$ ft) to accommodate the part 112, the low volume autoclave 102 may have a diameter of about 40 feet ($R_2 \approx 20$ ft) because the angled second portion 106 in connection to the first portion 104 permits a reduced volume to enclose the part 112. As deduced from Equation 1, both the surface area and volume of the low volume autoclave 102 is about a fourth of the surface area and volume, respectively, of the existing autoclave 114.

$$Vol = \pi \cdot R^2 \cdot h \qquad \text{Eq. 1}$$

As the sweep and/or dihedral angle α of the non-linear part 112 increases, the radius $R_1$ of an existing autoclave 114 increases with respect to the radius $R_2$. In turn, the volume derived from $R_1$ increases in proportion to the radius (or diameter) squared. Therefore, the low volume autoclave 102 creates a substantially greater savings in internal volume (minimizes excess/unused internal volume) as compared to the existing autoclave 114 which would be necessary to contain the part 112.

As discussed above, the existing autoclave 114 with an internal volume large enough to contain the part 112 may be very expensive to build, if not prohibitively difficult due to structural constraints and large amounts of materials that may be required to erect the autoclave. Further, the volume of an autoclave relates to the per cycle cost to operate the autoclave for curing the part 112 or other operations. Thus, it is advantageous to reduce the volume of the autoclave from at least a capital investment and a per cycle operation cost perspective.

In an exemplary process, the low volume autoclave 102 is opened at the joint 110 between the first portion 104 and the second portion 106. The first and second portions 104, 106 are separated to expose an interior configured for accepting an elongated part. The joint 110 may be configured to create the angle α between the portions and further create an opening with a seal. In some instances, the joining portion 108 may be replaced or reconfigured to create a different angle α between the first and second portions 104, 106. The opening may facilitate an insertion of the part 112 into the interior. The part 112 may be loaded into at least the first portion 104. The low volume autoclave 102 may then be closed by moving the first and second portions toward each other into a mating position where the seal may enable pressurization of the interior. In some instances, the closing process may include inserting the part 112 into the second portion 106.

Figure 2A:
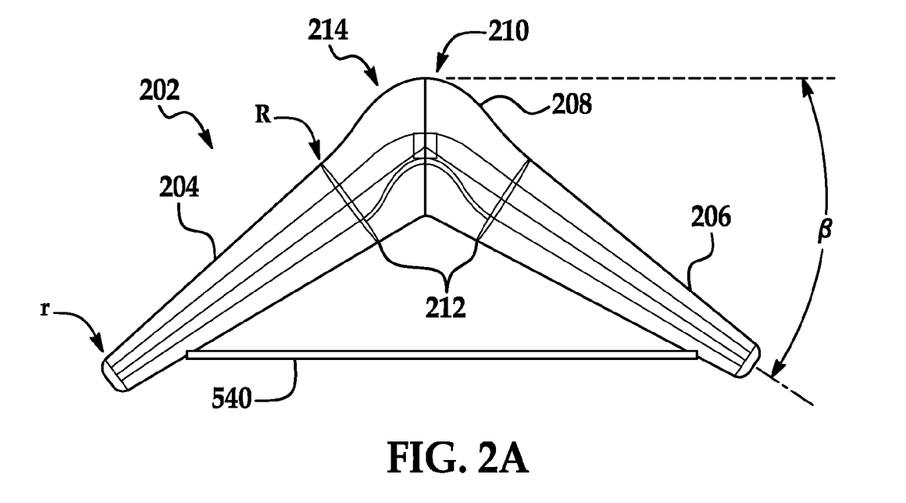
Figure 2B:
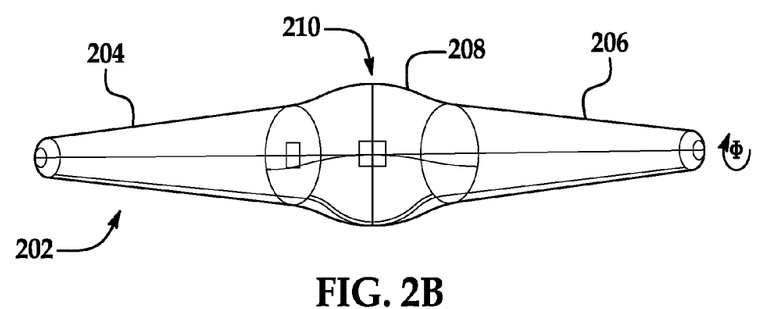

FIGS. 2A and 2B are isometric views of a low volume autoclave in accordance with another embodiment of the disclosure. FIG. 2A is a top view of an autoclave configured for curing an aircraft wing with a sweep angle β, and FIG. 2B is a front view of the autoclave in FIG. 2A. FIG. 2A illustrates an approximately conical (or bi-conical) autoclave 202 having a low volume. The conical autoclave 202 includes a first conical portion 204 and a second conical portion 206. A joining portion 208 is situated between the first and second conical portion 204, 206. The joining portion may further include a joint 210 that allows the conical autoclave 202 to open, thus exposing the interior of the autoclave.

The volume of the conical autoclave 202 can be approximately determined by Equation 2 for a frustum, or partial cone, having a large radius R and a smaller radius r. For some parts, such as the part 112, a frustum volume may completely enclose the part and reduce excess volume, while maintaining enough internal volume around the part to properly cure it during a curing process. For example, a specified airflow is typically desired around the part 112 situated within the conical autoclave to maintain consistent temperatures across the part during the curing process. Both intuitively, and through example calculations comparing Equation 1 and Equation 2, when r<R, the volume of the frustum portions shown in FIGS. 2a and 2b are less than the volume of a cylinder, as used in the previously-described autoclave 102 (FIGS. 1A and 1B). Therefore, the conical autoclave 202 may have a smaller volume than the cylindrical low volume autoclave 102.

$$Vol=1/3\pi \cdot h \cdot (R^2+Rr+r^2) \qquad \text{Eq. 2}$$

In further aspects, other geometries that reduce the internal volume of the autoclave may be employed while permitting the part 112 to be contained within the autoclave and maintaining proper operational tolerances necessary for proper operation of the autoclave, such as without limitation spacing to accommodate airflow, tooling, and other apparatus. For example, an autoclave may be formed from a generally shaped tube with a substantially circular cross section. The S-shaped autoclave may be tailored to curing complementary shaped parts that are too large to fit into (or otherwise unsuitable for) standard sized autoclaves, such as complementary shaped parts that measure greater than 100 feet in length. In further aspects, the disclosed autoclave does not require symmetry between the first portion 104 and the second portion 106. Further, additional portions may be included, and each portion may be separated by a joining portion including a joint.

Returning to FIG. 2A, the conical autoclave 202 further includes attachment surfaces 212 between the joining portion 208 and the first and second conical portion 204, 206. The attachment surfaces 212 may allow different joint portions 208 to be used, thus allowing the conical autoclave 202 to be configured for parts with different geometries (e.g. linear or non-linear), such as aircraft wings with different sweep angles β. In other embodiments, the joining portion 208 may be formed in a partially spherical shape 214 that includes a mating surface at the joint 210. The partially spherical shape may facilitate providing a circular cross-section along the joint 210 as further explained below. Thus, the partially spherical shape 214 may facilitate a rotation of an angle (φ) of the first conical portion 204 or second conical portion 206 about the joint 210 in order to change the angle β of the conical autoclave 202. In an exemplary configuration, Table 1 includes exemplary data for the angle φ created by rotating the first conical portion 204 relative the second conical portion 206, creating the angle β for the conical autoclave 202. The conical autoclave 202 may also include a brace 540 to prevent changes in the conical autoclave angle β, such as when the autoclave is in operation and under high pressure. Additional braces may be used to secure the conical autoclave 202 during part processing, such as during the curing of a part.

TABLE 1

| Rotation Angle φ Relative to Conical Portions | Resulting Sweep + Dihedral Angle α |
|---|---|
| 0° | 35° |
| 45° | 32° |
| 135° | 12.5° |
| 180° | 0° |

Figure 3A:
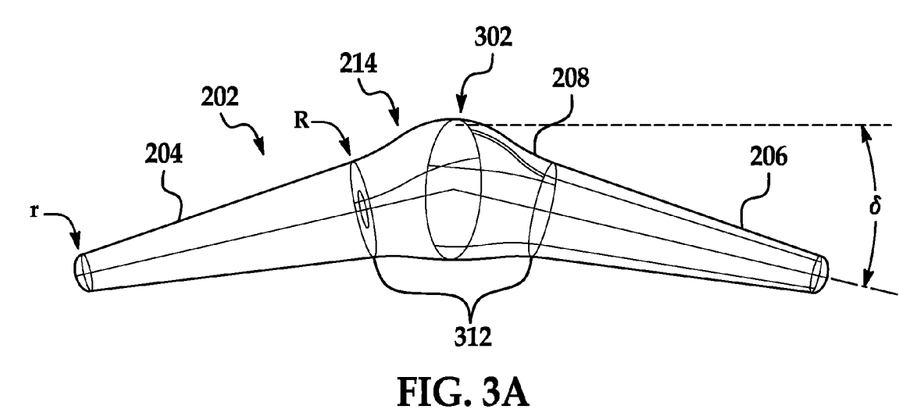
Figure 3B:
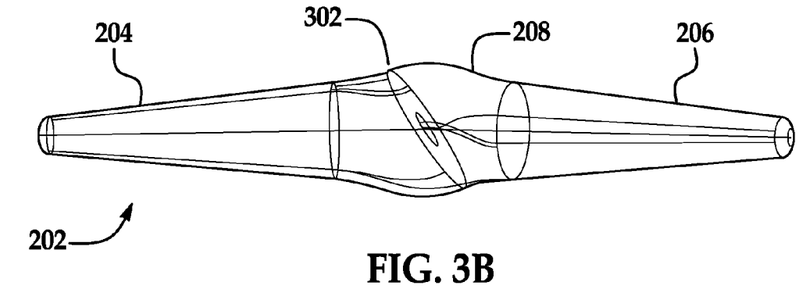

FIGS. 3A and 3B are isometric and elevational views of the low volume autoclave 202 in a second position. More specifically, FIG. 3A is a top view of the conical autoclave 202 configured for curing an aircraft wing with a relatively small sweep angle δ, and FIG. 3B is a side elevational view of the conical autoclave 202 in FIG. 3A. Comparison of FIG. 3A with FIG. 2A shows that the angle δ is substantially less than the angle β. In some embodiments, the angle δ may be achieved by replacing the joining portion 208 with another joint portion that creates the angle δ. In other embodiments, the joining portion 208 may include the joint 210 which may facilitate rotation to change the sweep angle from the angle β shown in FIG. 2A to the angle δ shown in FIG. 3A.

In other embodiments, the autoclave may in a toroidal configuration (i.e., a curved tube). In a toroidal configuration, the large part (e.g., aircraft wing) may be rotated into the toroidal autoclave. In still further embodiments, some or all aspects of the cylindrical, conical, and toroidal autoclaves may be combined to create an autoclave capable of curing large parts without excessive internal volume.

Figure 4:
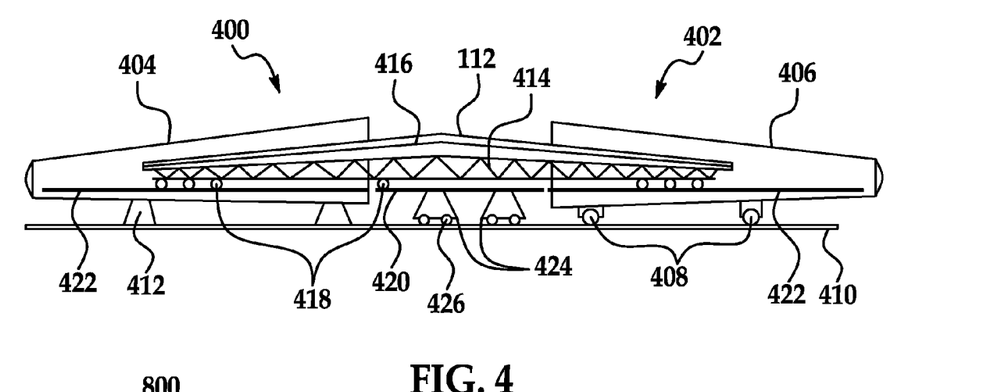
FIG. 4 is an illustration of a side elevation view of a shape low volume autoclave, including carts, tools and tracks for positioning a part within the autoclave, in accordance with an embodiment of the disclosure.

FIG. 4 is a side elevation view of a low volume autoclave, including carts, tools and tracks for positioning the part 112 within the autoclave, in accordance with an embodiment of the disclosure. An environment 400 includes a conical autoclave 402 with a first conical portion 404 and a second conical portion 406. In some embodiments, either the first conical portion 404 or the second conical portion 406, or both, may be movable by wheels 408 or other motion enabling features. For example, the second conical portion 406 may be movable along a stationary track 410 configured to guide the wheels 408, and thus the second conical portion 406, toward the first conical portion 404. Additionally, either the first conical portion 404 or the second conical portion 406 may be stationary, such as being secured on legs 412. In an exemplary embodiment, the second conical portion 406 may include wheels accepted by a complementary track while the first conical portion 404 may be stationary and supported by the legs 412. In operation, the conical autoclave 402 may be opened to expose the interior and either load or remove the part 112 by first rolling the second conical portion 406 away from the first conical portion 404. Conversely, the autoclave may be closed by reversing the above operation.

In addition, the environment 400 may include a jig 414 to support a tool 416. The tool 416 may be used in the autoclave to support the uncured part 112 during a curing process, such as an uncured aircraft wing formed from fiber-reinforced composite material. The jig may include jig wheels 418 or other motion enabling features. The jig wheels 418 may traverse an elevated track 420 and autoclave tracks 422, or other substantially planar surface, to move the jig 414. The elevated track 420 may be supported by carts 424. Similar to the jig 414, the carts 424 may include cart wheels 426 that may be used to traverse the stationary (or non-stationary) track 410. In some embodiments, more than one stationary track 410 may be used to move the jig 414 and the first conical portion 404. Similarly, more than one elevated track 420 may be used in the environment 400.

Figure 5:
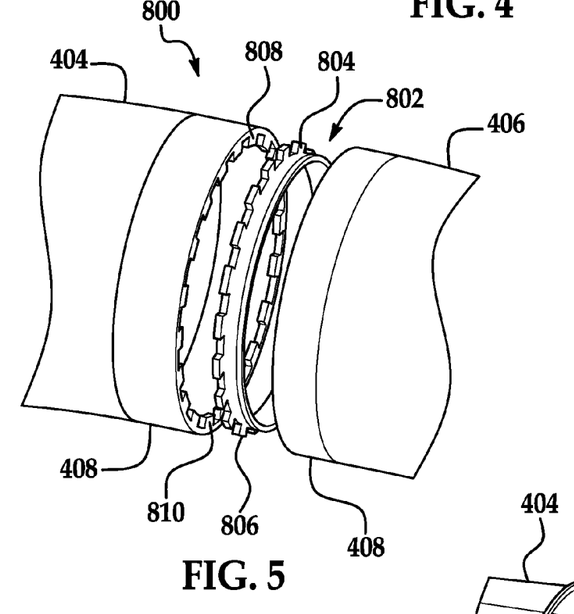
FIG. 5 is an illustration of an exploded isometric view of an exemplary locking mechanism for a shape low volume autoclave in accordance with another embodiment of the disclosure.

FIG. 5 is an exploded isometric view of an exemplary locking mechanism 802 for a low volume autoclave in accordance with another embodiment of the disclosure. More specifically, an environment 800 includes a locking mechanism 802 that securely joins the first conical portion 404 to the second conical portion 406 when the conical autoclave 402 is in the closed configuration. In this embodiment, the locking mechanism 802 includes a first cog 804 with first cog teeth 806 that may engage a second cog 808 with second cog teeth 810. The first and second cog teeth 806, 810 have slots with the same pitch as the teeth, thus allowing the teeth from the first cog 804 to be inserted through the second cog 808.

In operation, the first cog 804 and the second cog 808 may engage each other when the first conical portion 404 and the second conical portion 406 are mated, and with the first cog teeth 806 aligned with the slots formed between the second cog teeth 810. Either the first cog 804 or the second cog 808 may be rotated to align the first cog teeth 806 and the second cog teeth 810, thus tightly securing the conical autoclave 402 in the closed position. For example and without limitation, the first cog may be rotatably connected to the joining portion 208 of the second conical portion 406, and thus rotate into a secure position by either manual or mechanical rotation. In other instances, the rollers 708 may provide the rotation necessary to engage the first cog teeth 806 with the second cog teeth 810 in a secure position. Other features, including locking and tightening features, gaskets, lips, bumps, flanges, or the like may be included in the locking mechanism 802 to create a tight and secure connection between the first and second conical portion 404, 406, thus facilitating the autoclave to maintain high temperatures and high pressures during operation.

Figure 6:
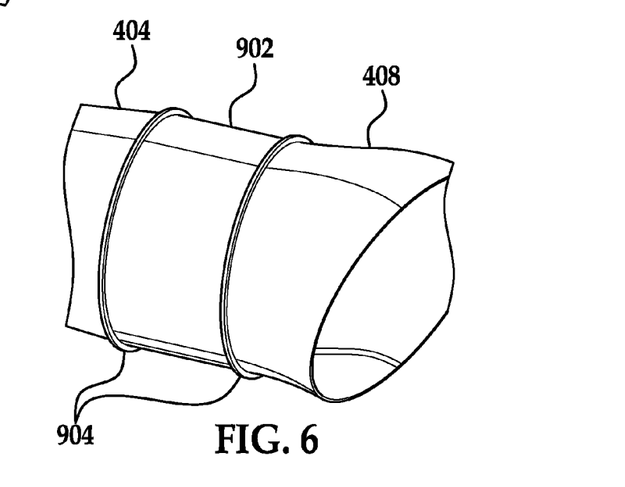
FIG. 6 is an illustration of an isometric view of an exemplary cylindrical insert for a low volume autoclave in accordance with another embodiment of the disclosure.

FIG. 6 is an isometric view of an exemplary cylindrical insert for a low volume autoclave in accordance with another embodiment of the disclosure. More specifically, in this embodiment, an environment 900 includes an insert 902 that is configured to be used to extend the length of the autoclave or otherwise modify the internal cavity of the conical autoclave 402. For example, the part 112 may be cured within the conical autoclave 402 when the insert 902 is attached to flanges 904 between the first conical portion 404 (or any other conical portion) and the joining portion 208.

Figures 7, 8:
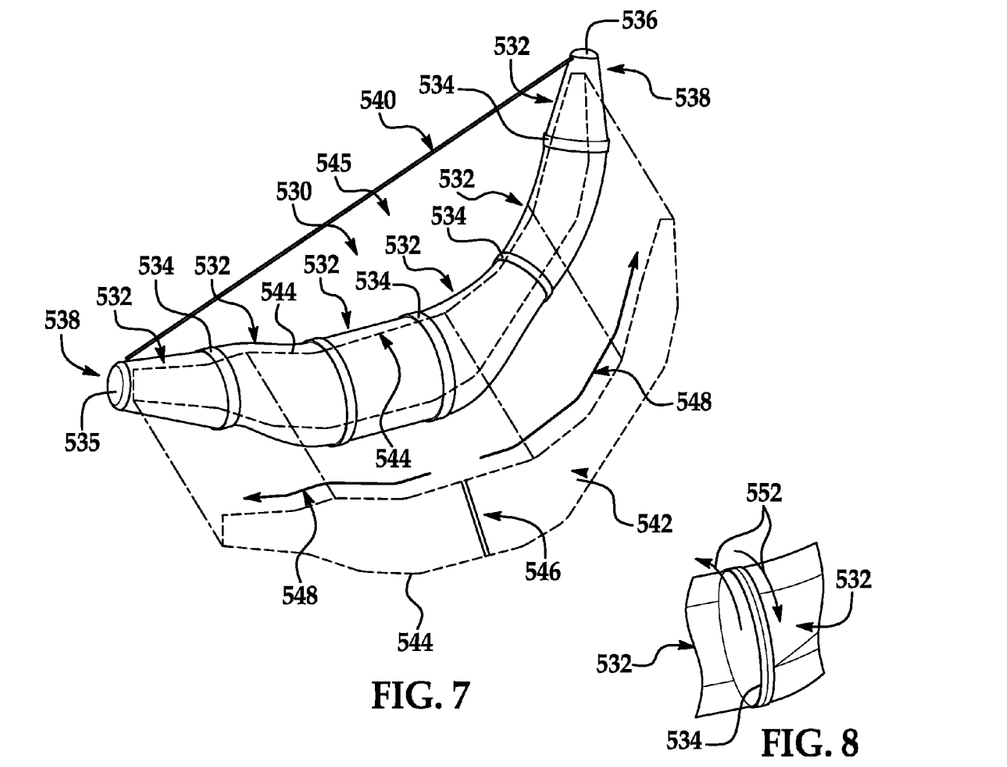
FIG. 7 is an illustration of a perspective view of a low volume autoclave having a configurable shape in relation to a tooling envelope indicated in broken lines.
FIG. 8 is an illustration of a perspective view of one of the joints between portions of the autoclave shown in FIG. 7.

Attention is now directed to FIG. 7 which illustrates another embodiment of a low volume, configurable autoclave 530 that has been configured to process an irregularly shaped, generally curved part (not shown). The part is typically placed on a set of tooling (not shown) defining a tooling envelope 542 indicated by the broken line 544. The autoclave 530 comprises a plurality of autoclave portions 532 wherein adjacent ones of the portions 532 are coupled with each other for axial rotation by a joint 534. As shown in FIG. 8, the joint 534 allows relative axial rotation of adjacent portions 532 to allow reconfiguration of the shape of the autoclave 530 to substantially match the tooling envelope 532 of any of a plurality of differently shaped parts (not shown). The joint 544 may comprise, for example and without limitation, a joint of the type shown in FIG. 5 which includes a locking mechanism 802 having interlocking cogs 804, 808 and cog teeth 806, 810. As previously described the locking mechanism 802 locks adjacent ones of the autoclave portions 532 in any of a plurality of axial positions and forms an air tight seal between the autoclave portion 532 when the autoclave 540 is pressurized.

The part (not shown) positioned within the tooling envelope 542 has a cross section with a maximum dimension 546. The tooling envelope 542 may be inwardly tapered, away from the maximum dimension 546, as shown by the arrows 548. As previously discussed, the low volume configurable autoclave 530 has interior surfaces (not shown) that generally complementary to the combination of the part and the tooling envelope 542 but are slightly spaced from the tooling envelope 542 and the exterior contour of the part to allow movement of air during the pressurization process, a well as expansion of the tooling and the part during processing. The extremities 538 of the autoclave 530 may include integrated end caps or covers 536 in order to form a complete, air tight enclosure surrounding tooling envelope 542. The rotatable joints 534 allow one or more of the autoclave portions 532 to be rotated in order to change the shape of the internal volume of the autoclave 530 to accommodate differently shaped parts. Moreover, one or more autoclave portions 532 may be added to or removed from the autoclave 530 in order to reconfigure the autoclave 530 to accommodate differently shaped parts.

In some embodiments, a brace 540, which may comprise a flexible or rigid member, may be connected at or near the extremities 538 of the autoclave 530 in order to prevent movement of the autoclave portions 532 during pressurization. The use of one or more braces 540 may allow the autoclave portions 532 to be fabricated of thinner and/or lighter materials. In other embodiments, the brace 540 may not extend across the entire length of the autoclave 540, but instead may extend across only a portion of one or more bows formed by the autoclave portions 532.

Figure 9:
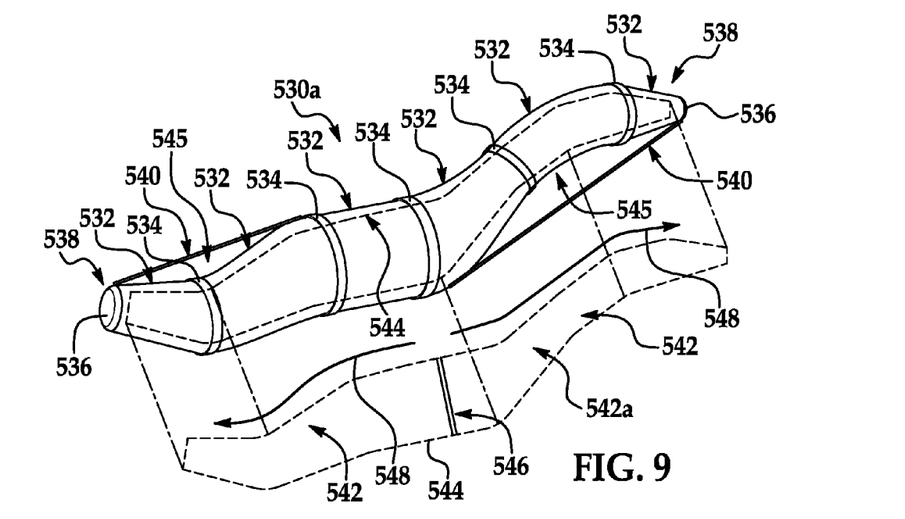
FIG. 9 is an illustration of the autoclave shown in FIG. 7 following reconfiguration of the portions to accommodate a differently shaped tooling envelope.

FIG. 9 illustrates an autoclave 530a having a shape that is achieved by reconfiguring the autoclave portions 532 of the autoclave 530 shown in FIG. 7. Reconfiguration of the autoclave 530 shown in FIG. 7 is achieved by rotating the autoclave portions 532 about joints 534 until the internal volume of the autoclave 530a is shaped to substantially match the tooling envelope 542a corresponding to a part that is shaped differently than that which can be processed during the autoclave 530 shown in FIG. 7. Similar to the embodiment shown in FIG. 7, the cross section of the tooling envelop 542a has a maximum cross sectional dimension 546 and may be tapered in a direction away from the maximum dimension 546, as shown by the arrows 548. In the configuration shown in FIG. 9, the autoclave 530a includes a pair of bows 545 along its length. In order to strengthen the autoclave 530a and resist movement of the autoclave portions 532 during pressurization, a pair of braces 540 are installed on the autoclave 530a, respectively spanning the bows 545.

Figures 10, 12:
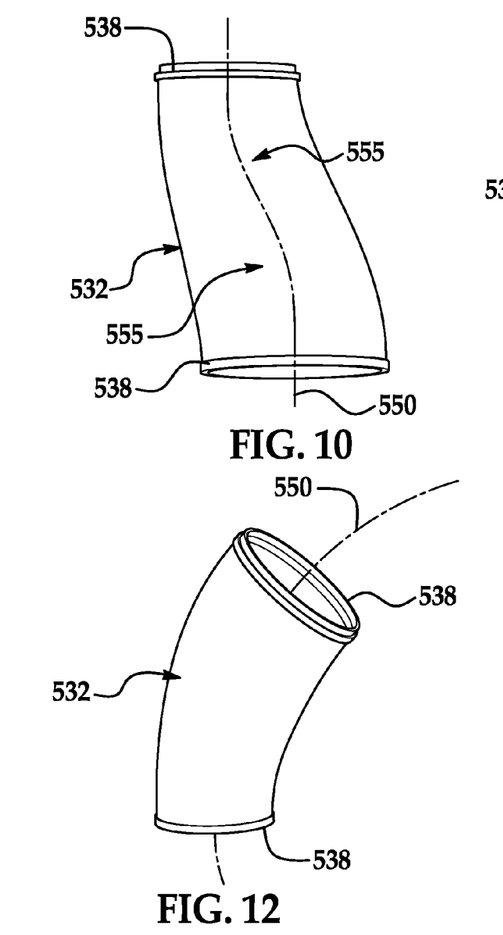
FIGS. 10-15 are illustrations of isometric views of different shapes of the configurable portions of the low volume autoclave.
Figure 11:
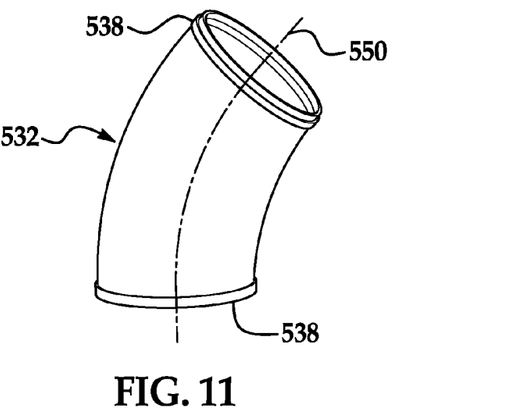
Figure 13:
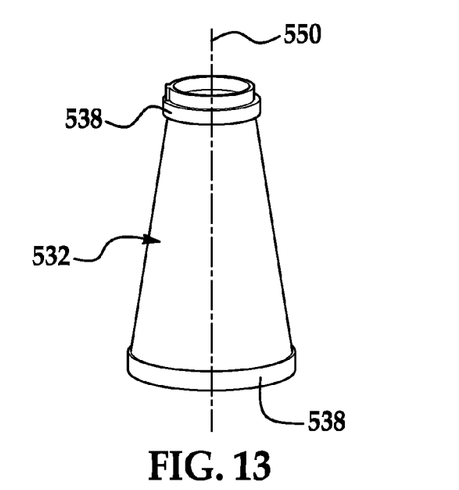

Referring now to FIGS. 10-15, the autoclave portions 532 may have any of a variety of shapes and geometries. For example, FIG. 10 illustrates an autoclave portion having substantially parallel bases 538 with respectively different diameters and a centroid line or central axis 550 that has a pair of curves 155. FIG. 11 illustrates a torus shaped autoclave portion 532 having a curved central axis 550 and non-parallel bases 538 that are substantially the same diameter. In FIG. 11, the central axis 550 is a circumferential arc with a constant radius. FIG. 12 illustrates an autoclave portion 532 similar to that shown in FIG. 11 but wherein the bases 538 have differing diameters. The central axis 550 is a circumferential arc while the radius 562 varies. FIG. 13 illustrates a frusto-conical shaped autoclave portion 532 having substantially parallel bases 538 with differing diameters and a substantially straight central axis 550.

Figure 14:
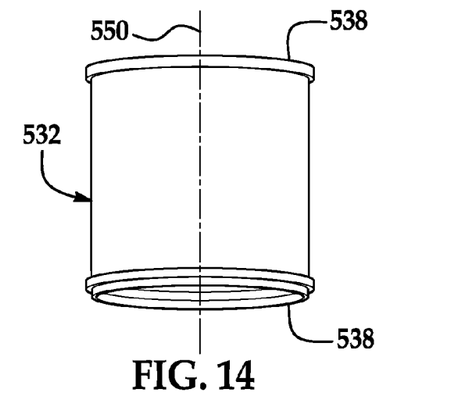
Figure 15:
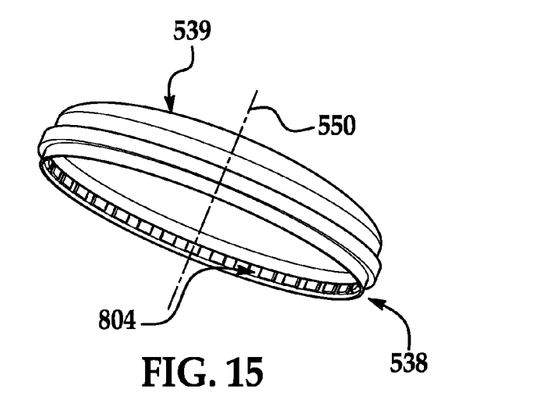

FIG. 14 illustrates a straight cylinder portion 532 having substantially parallel bases 538 of the same diameter and a central axis 550. FIG. 15 illustrates an autoclave door 539 having a single base 538 equipped with clogs 804 which form part of a locking mechanism used to attach the door 539 to the base 538 of one of the autoclave portions 532. Although not shown in FIG. 15, the door 539 may have additional depth along its central axis 550 so that it forms a volume that surrounds part of the part being processed.

Figure 16:
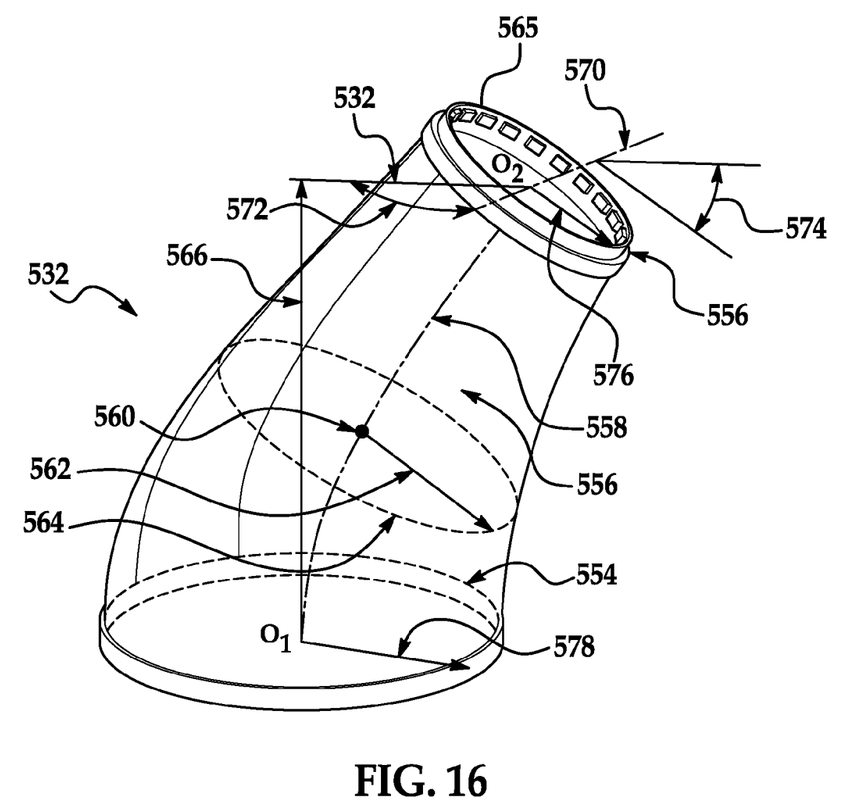
FIG. 16 is an illustration of a typical portion of the low volume autoclave.

FIG. 16 illustrates an idealized neutral skin 556 of an arbitrary autoclave portion 532 useful in describing guidelines for designing the shape and features of autoclave portions 532 that allow reconfiguration of the disclosed autoclave 530 (FIG. 7). For simplicity of description, the thickness of the autoclave 530 will be ignored and the skin 556 is intended to represent the configurable shape of the internal volume of the autoclave 530.

The autoclave portion 532 shown in FIG. 16 has at least one and no more than two circular bases 554, 556 respectively having centers $O_1$, $O_2$. Each base 554, 556 may be provided with a locking mechanism 565 similar to that previously described which locks the autoclave portion 542 in a desired rotational relationship to an adjacent portion 532. The center $O_1$ of the base 556 may be offset a distance shown by line 568 from a line 566 extending through center $O_1$ and substantially normal to the base 554. Line 568 is parallel to base 554. A line 570 passing through the center $O_2$ of base 556 is inclined at an angle 572 relative to line 568 in a plane that is parallel to base 554. The numeral 574 indicates the angle of inclination of base 556 relative to line 570. Because of the offset between the bases 554, defined by the length of line 568, the central axis or centroid line 554 passing through centers $O_1$, $O_2$ is curved. The central axis 558 is substantially normal to at least one of the bases 554, 556. At any point 560 along the central axis 558, a cross section 564 through the autoclave portion 532 is a circle in a plane substantially normal to the central axis 558 at point 560. The cross section 564 has a radius 562 and the neutral surface 556 of the autoclave portion 532 is formed by a plurality of circular cross sections along the central axis 558.

Figure 17:
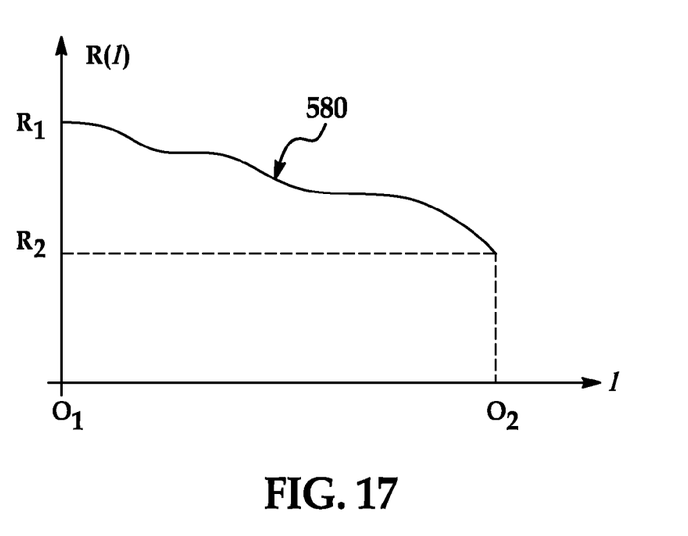
FIG. 17 is a graphical plot of the radius of the autoclave portion shown in FIG. 16, measured along the central axis between opposite bases of the portion.

Referring now to FIG. 17, the radius 562 shown in FIG. 16 and represented as R(1) in FIG. 17, may decrease monotonously, moving along the central axis 558 from the center $O_1$ of base 554 to the center $O_{12}$ of base 556. The curve 580 represents the change in radius from $R_1$ to $R_2$ at two arbitrary points along the central axis 558, as point 560 shown in FIG. 16 moves from $O_1$ to $O_2$. In addition to the requirement that the radius 562 decreases monotonously from center $O_1$ to center $O_1$, the radius of curvature (not shown) of the central axis 558 may not be less than the value of the radius 568 at any point along the central axis 558.

Figure 18:
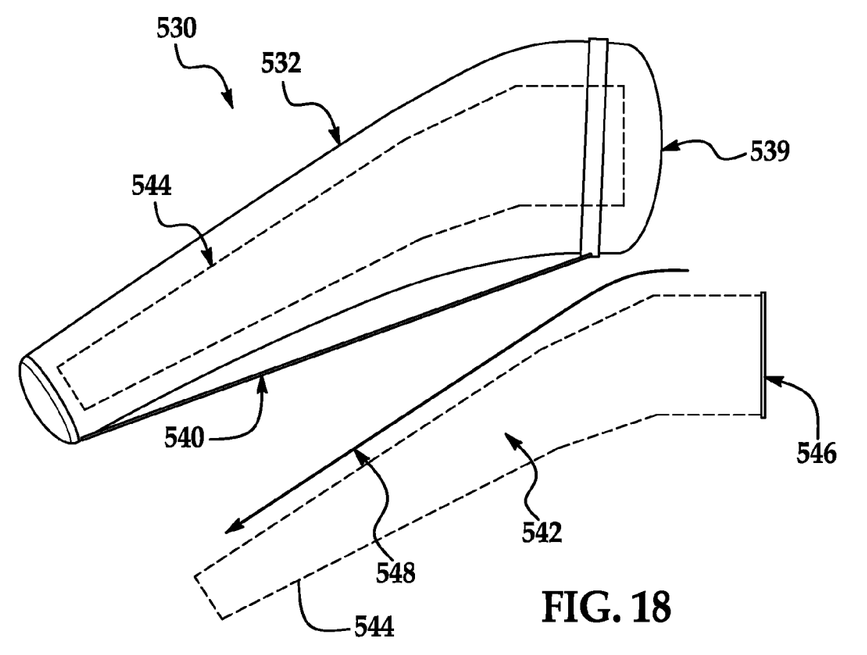
FIG. 18 is an illustration of a perspective view of another embodiment of a low volume configurable autoclave in relation to a tooling envelope suitable for processing an aircraft part.

FIG. 18 illustrates an autoclave 530 having a single autoclave portion 532 and an autoclave door 539 shaped to accommodate a tooling envelope 542 generally having the shape of an aircraft wing box or an aircraft wing panel (not shown). The tooling envelope 542 for the aircraft wing box or panel has a maximum cross section dimension 546 and tapers in the direction shown by arrow 548. The autoclave portion 530 may be strengthened against movement or deformation by the use of a brace 540 connected between the opposite ends of the autoclave portion 530.

Figure 19:
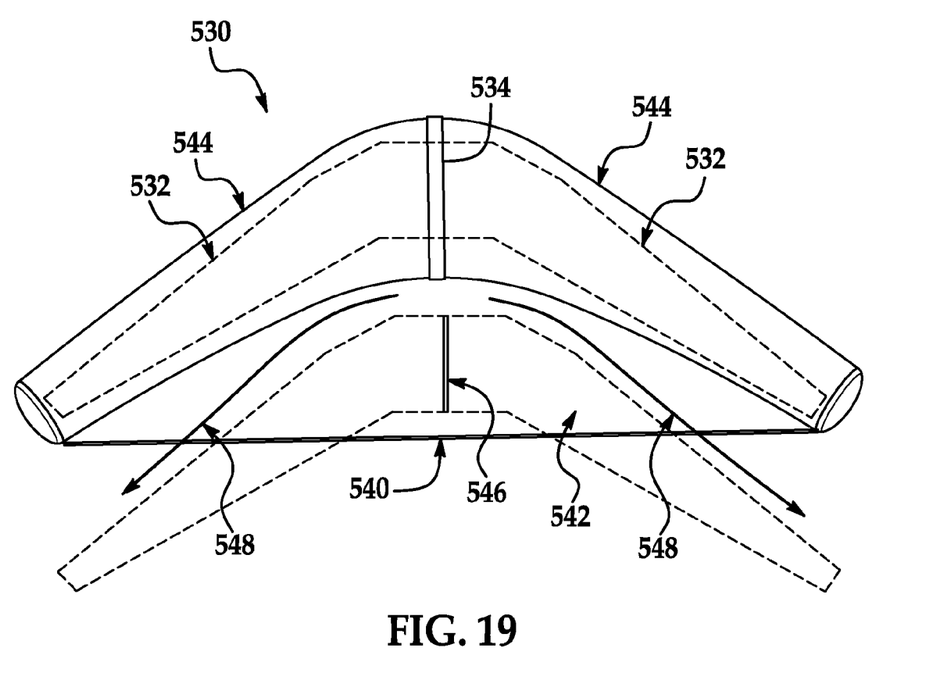
FIG. 19 is an illustration of an isometric view of a low volume configurable autoclave and related tooling envelope suitable for processing aircraft wings.

FIG. 19 illustrates a low volume, configurable autoclave 530 that may be used to cure a part such as a single piece aircraft wing box (not shown) airplane single piece wing panel (not shown) or horizontal stabilizer (not shown) having a geometry that lies within the tooling envelope 542. The maximum cross sectional dimension of the tooling envelop 542 is shown at 546. The autoclave 530 comprises two autoclave portions 532 that are substantially symmetrical and are connected by a central joint 534 of the type previously described which allows curing parts with varying angles of sweep with or without a non-swept center section (not shown).

Figure 20:
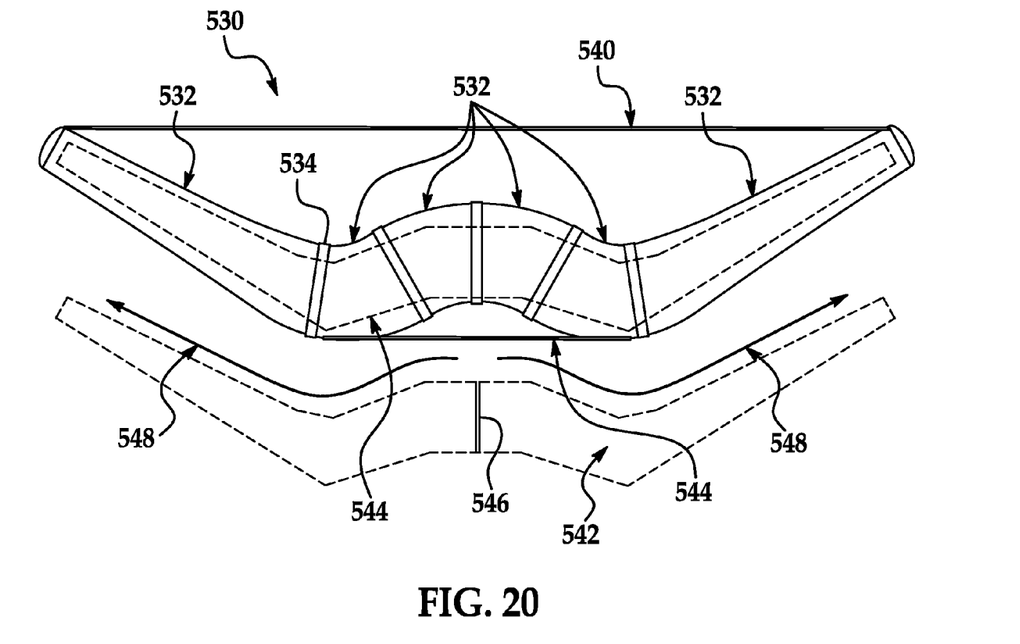
FIG. 20 is an illustration of an isometric view of another embodiment of the low volume configurable autoclave and related tooling envelope suitable for processing another shape of an aircraft wing.

FIG. 20 illustrates a low volume, configurable autoclave 530 comprises six autoclave portions 532 connected together by joints 534 that may be used to cure a single piece aircraft multi-swept wing box or airplane single piece multi-swept wing panel as well as other similarly shaped parts. The autoclave configuration shown in FIG. 20 allows curing of parts that have various positive and negative sweep angles and is substantially symmetrical relative to the center of the tooling envelope which has a maximum cross sectional dimension 546.

Figure 21:
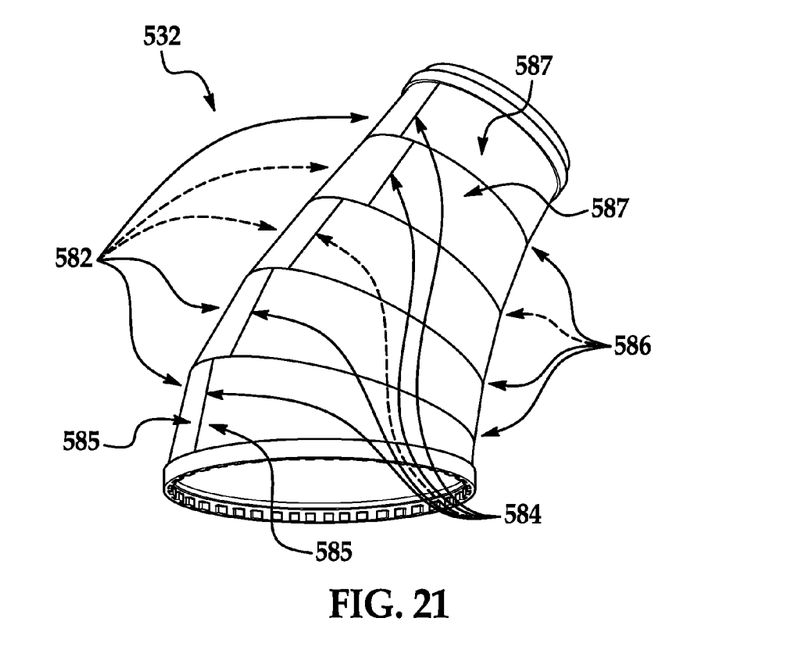
FIG. 21 an illustration of an isometric view of the autoclave portion of FIG. 16, showing how the autoclave portion may be fabricated.

Attention is now directed to FIG. 21 which illustrates additional details of one technique for fabricating any of the autoclave portions 532 previously described. The autoclave portion 532 may comprise a plurality of metal plates 582 rolled to shape from flat metal. The opposite edges 585 of each plate 582 are joined together by any suitable technique, such as, without limitation, welding them along seams 584. The circumferential edges 587 of adjacent plates 582 are joined to each other by any suitable means such as welding along seams 584. In the illustrated example, each of the rolled metal plates 582 is slightly frusto-conical in shape.

Figure 22:
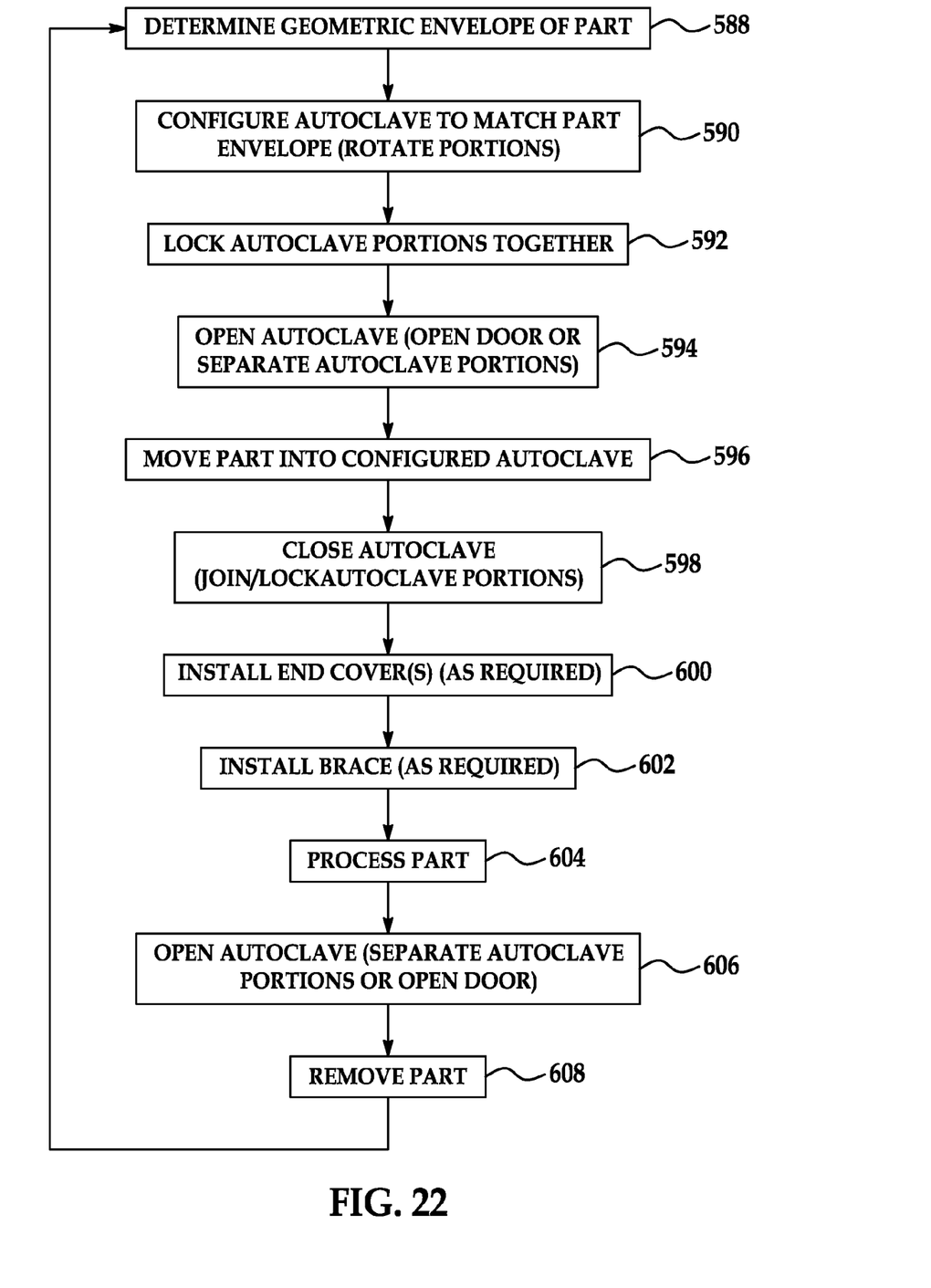
FIG. 22 is an illustration of a flow diagram of a method of autoclaving differently shaped parts using a low volume, configurable autoclave.

Attention is now directed to FIG. 22 which broadly illustrates the steps of a method of autoclaving parts using the low volume, configurable autoclave 530 discussed previously. Beginning at 588, the geometric envelope of a part (not shown) is determined using any suitable technique, including CAD (computer aided drawing) files or part measurements. Next, at 590, the autoclave 530 is configured to substantially match the part envelope, including associated tooling on which the part is placed. Configuring of the autoclave at 590 may include rotation of one or more of the autoclave portions 532 to achieve the desired shape of the internal volume of the autoclave 530.

Having generally configured the autoclave 530, next, at 592 the autoclave portions 532 are joined and locked together using the previously described locking mechanism 802, following which the autoclave 530 is opened at 594, either by opening an autoclave door 539 or separating one or more of the autoclave portions 532. Next, at 596, the part to be cured is moved into the configured autoclave 530, and at 598 the autoclave 530 is closed by rejoining the autoclave portions and/or installing or closing a door 539 on the autoclave 530. At 600, additional end caps 536 may be installed as required, if not already integrated into the portions 532 at the opposite extremities 538 of the autoclave 530. At 602, one or more braces 540 may be attached to portions 532 of the autoclave 530. It should be noted here that the autoclave portions may be installed together around the part using other sequences that are suited to the size and shape of the part being processed. A 604, the part may be processed within the autoclave 530 at suitable pressures and elevated temperatures. Following curing, at 606, the autoclave may be opened by separating one or more of the autoclave portions 532, or opening a door 539, following which, the part may be removed at 608. The autoclave 530 may then be reconfigured to process one or more parts of different shapes by repeating steps 588-608, during which autoclave portions 532 may be added to or removed from the autoclave 530.

Figure 23:
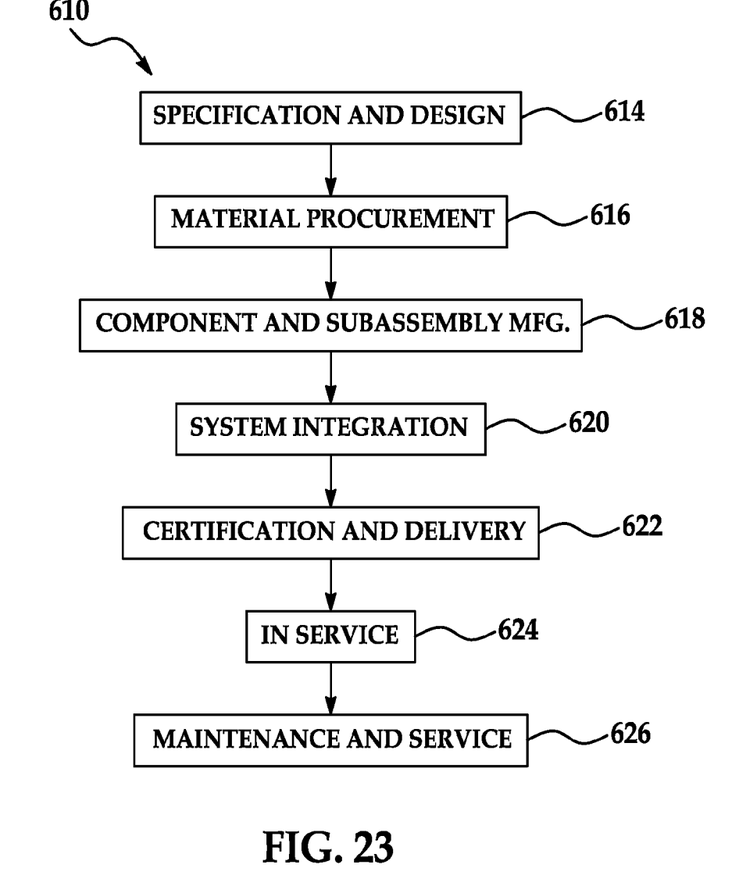
FIG. 23 is an illustration of a flow diagram of aircraft production and service methodology.
Figure 24:
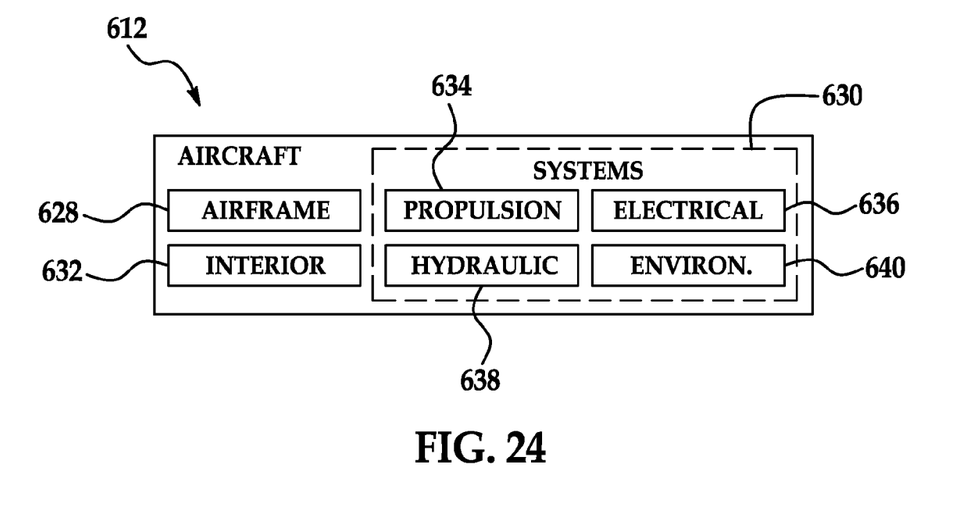
FIG. 24 is an illustration of a block diagram of an aircraft.

Referring next to FIGS. 23 and 24, embodiments of the disclosure may be used in the context of an aircraft manufacturing and service method 610 as shown in FIG. 23 and an aircraft 612 as shown in FIG. 24. During pre-production, exemplary method 610 may include specification and design 614 of the aircraft 610 and material procurement 616. During production, component and subassembly manufacturing 618 and system integration 620 of the aircraft 612 takes place. During step 618, the disclosed method and apparatus may be employed to fabricate composite parts such as wings, wing boxes, stabilizers, and fuselages to name only a few, which are then assembled at step 620. Thereafter, the aircraft 612 may go through certification and delivery 622 in order to be placed in service 624. While in service by a customer, the aircraft 612 may be scheduled for routine maintenance and service 626 (which may also include modification, reconfiguration, refurbishment, and so on).

Each of the processes of method 610 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 24, the aircraft 612 produced by exemplary method 610 may include an airframe 628 with a plurality of systems 630 and an interior 632. The disclosed method and apparatus may be employed to fabricate wings, wing boxes, stabilizers, fuselages and other arbitrarily shaped parts and families of parts which form part of the airframe 628 or other structural sections of the aircraft 612. Examples of high-level systems 630 include one or more of a propulsion system 634, an electrical system 636, a hydraulic system 638 and an environmental system 640. Any number of other systems may be included. Although an aircraft example is shown, the disclosed embodiments may be employed to fabricate structures used in other flight vehicles including manned or unmanned military aircraft, rotary wing aircraft, or ballistic flight vehicles. The disclosed embodiments may also be employed to fabricate structures used in other vehicles and vessels, including those used in marine and land-based vehicles.

The apparatus embodied herein may be employed during any one or more of the stages of the production and service method 610. For example, components or subassemblies corresponding to production process 618 may be fabricated or manufactured in a manner similar to components or subassemblies produced while the aircraft 610 is in service. Also, one or more apparatus embodiments may be utilized during the production stages 618 and 620, for example, by substantially expediting assembly of or reducing the cost of an aircraft 612. Similarly, one or more apparatus embodiments may be utilized while the aircraft 612 is in service, for example and without limitation, to maintenance and service 626.

Although the embodiments of this disclosure have been described with respect to certain exemplary embodiments, it is to be understood that the specific embodiments are for purposes of illustration and not limitation, as other variations will occur to those of skill in the art.

What is claimed:

1. An autoclave, comprising:
  a pressure vessel with a first portion and a second portion, the first portion having a first end which is sealed and a second end, and the second portion having a third end which is sealed and a fourth end; and
  a circumferential joint connecting the second end of the first portion and the fourth end of the second portion, the first and second portions defining an interior configured for accepting a part, the circumferential joint being configured to create an angle between the first and second portions and further creating a cavity with a seal, the cavity facilitating an insertion of the part into the interior, and the seal enabling pressurization of the interior, the circumferential joint allows the autoclave to rotationally unlock while a portion of the second end and the fourth end remain connected.

2. The autoclave of claim 1, wherein the first portion and the second portion are conical portions with bases of the conical portions joined by the circumferential joint.

3. The autoclave of claim 1, wherein the angle is variable.

4. The autoclave of claim 1, further including a tubular insert between the first portion and the circumferential joint for extending the cavity.

5. The autoclave of claim 1, wherein the part is a single piece composite swept wing skin or swept horizontal stabilizer, including at least one of a sweep angle and a dihedral angle.

6. The autoclave of claim 1, wherein the circumferential joint is substantially in a middle of the autoclave.

7. A low volume autoclave, comprising:
  a pressure vessel having a joint between a first portion with a first longitudinal axis and a second portion with a second longitudinal axis, the first portion and the second portion each defining a portion of an internal cavity for accepting a part, the joint creating an angle between the first longitudinal axis of the first portion and the second longitudinal axis of the second portion, the joint having a seal to facilitate increased pressure and heat within the pressure vessel when the pressure vessel is configured in a closed position, the joint is configured to allow the autoclave to rotationally unlock while a portion of the first portion and the second portion remain connected; and
  a transport system for movably opening and closing the pressure vessel by separating the first portion from the second portion at the joint, the transport system configured to insert and remove the part from the internal cavity.

8. The autoclave of claim 7, wherein the joint includes a first cog with mating teeth that engage a second cog with complementary slots to facilitate locking the first portion to the second portion when the pressure vessel is in the closed position.

9. The autoclave of claim 7, wherein the first portion and the second portion are substantially conical portions with bases of the conical portions joined by the joint, further comprising a swept joining portion that includes the joint, the joint having a circular profile that facilitates rotation of one of the substantially conical portions to adjust the angle between the first longitudinal axis of the first portion and the second longitudinal axis of the second portion.

10. An autoclave for processing differently shaped, elongate parts, comprising:
  a first portion;
  a second portion axially rotatable relative to the first portion;
  a locking mechanism for locking the first and second portions together in any of a plurality of axial rotational positions; and
  a joint connecting the first portion and the second portion, the joint configured to allow the autoclave to rotationally unlock while a portion of the first portion and the second portion remain connected, and expose an interior of the autoclave for insertion of the part into the interior of the autoclave via the joint.

11. The autoclave of claim 10, wherein at least one of the first and second portions includes first and second substantially circular bases and a curved centroid line extending between centers of the bases.

12. The autoclave of claim 10, wherein at least one of the first and second portions includes first and second substantially circular bases and the first base has a diameter larger than that of the second base.

13. The autoclave of claim 11, wherein a first center of the first base is laterally offset from a second center of the second base along a line extending through the first center and being substantially perpendicular to the first base.

14. The autoclave of claim 11, wherein the first and second bases respectively lie in a first plane and second plane, and wherein the first plane is different than the second plane.

15. The autoclave of claim 11, wherein one of the first and second portions includes an end cap forming an airtight closure on one end of the autoclave.

16. The autoclave of claim 11, wherein at least one of the first and second portions includes a door through which a part may be inserted into the autoclave.

17. The autoclave of claim 11, wherein the shape of the first portion is one of:
  a frusto-circular cone,
  a right circular cylinder,
  a curved cylinder, and
  a frustum having a curved central axis.

18. An autoclave having a configurable internal volume for processing any of a plurality of differently shaped parts, comprising:
  a plurality of portions respectively having differing internal volume shapes; and
  corresponding joints between at least certain adjacent portions of the plurality of portions, the corresponding joints each configured to allow the certain adjacent portions to rotate relative to each other, the joint allows the autoclave to rotationally unlock while the adjacent portions remain connected.

19. The autoclave of claim 18, wherein the joint includes a locking mechanism for locking the certain adjacent portions together in any of a plurality of axial rotational positions.

20. The autoclave of claim 18, further comprising:
  a brace coupled between the certain adjacent portions for securing the certain adjacent portions against movement relative to each other when the autoclave is pressurized.

21. The autoclave of claim 18, wherein at least one of the plurality of portions includes first and second substantially circular bases and a curved central axis extending between the bases, wherein a first center of the first base is laterally offset from a second center of the second base along a line extending through the first center and being substantially perpendicular to the first base.

22. A pressure vessel comprising two or more mating sections, the two or more mating sections comprising corresponding section envelopes, the corresponding section envelopes having corresponding surfaces of rotation around corresponding geometric axes of rotation, wherein a given axis of rotation for a given pair of adjacent section envelopes meets at a given angle, the given angle being between about 90 degrees and about 180 degrees, wherein the two or more mating sections each terminate geometrically to corresponding circular contours, the corresponding circular contours comprising corresponding mating borders for adjacent mating sections, wherein the corresponding circular contours lay in corresponding planes that form corresponding substantially equal angles with the corresponding geometric axes of rotation for ones of adjacent mating sections, and wherein the corresponding circular contours comprise corresponding locking mechanisms that are each configured to rotationally lock and unlock with each other.

23. The pressure vessel of claim 22, wherein the corresponding locking mechanisms are configured to be locked or unlocked using a rifle bolt action such that the corresponding locking mechanisms are configured to unlock up on rotation, and to cause the adjacent mating sections to open upon the corresponding locking mechanisms being drawn back.

24. The pressure vessel of claim 22, wherein adjacent ones of the two or more mating sections are configured to be rotated along corresponding geometric axes of rotation in opposite angular directions until planes of their terminating circular contours become substantially co-planar.

25. The pressure vessel of claim 24, wherein the adjacent ones of the two or more mating sections are configured to be connected and locked together once their terminating circular contours become substantially co-planar.

* * * * *